United States Patent
Hwang et al.

(10) Patent No.: US 9,601,804 B2
(45) Date of Patent: Mar. 21, 2017

(54) GEL POLYMER ELECTROLYTE, LITHIUM BATTERY INCLUDING GEL POLYMER ELECTROLYTE, AND METHOD OF PREPARING GEL POLYMER ELECTROLYTE

(75) Inventors: Seung-sik Hwang, Seongnam-si (KR); Han-su Kim, Seoul (KR); Jae-man Choi, Hwaseong-si (KR); Moon-seok Kwon, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 959 days.

(21) Appl. No.: 13/242,344

(22) Filed: Sep. 23, 2011

(65) Prior Publication Data

US 2012/0015255 A1    Jan. 19, 2012

Related U.S. Application Data

(63) Continuation-in-part of application No. 12/615,376, filed on Nov. 10, 2009, now Pat. No. 8,993,175.

(30) Foreign Application Priority Data

Nov. 10, 2008 (KR) .................. 10-2008-0111221
Dec. 2, 2008 (KR) .................. 10-2008-0121285
(Continued)

(51) Int. Cl.
*H01M 10/056* (2010.01)
*H01M 10/0565* (2010.01)
(Continued)

(52) U.S. Cl.
CPC ... *H01M 10/0565* (2013.01); *H01M 10/0567* (2013.01); *H01M 10/0568* (2013.01);
(Continued)

(58) Field of Classification Search
None
See application file for complete search history.

(56) References Cited

U.S. PATENT DOCUMENTS 4,886,716 A    12/1989    Roggero et al.
5,741,610 A     4/1998    Andrei et al.
(Continued)

FOREIGN PATENT DOCUMENTS

DE    198 30 993    1/2000
EP      0 638 950    2/1995
(Continued)

OTHER PUBLICATIONS

Machine translation for Uchida et al., JP 2004-311140 A.*
(Continued)

*Primary Examiner* — Barbara Gilliam
*Assistant Examiner* — Adam A Arciero
(74) *Attorney, Agent, or Firm* — Cantor Colburn LLP

(57) ABSTRACT

A gel polymer electrolyte including: an organic solvent; a lithium salt that reacts with residual water contained in the organic solvent to produce at least one material selected from the group consisting of a protonic acid and a Lewis acid; and a polymer that is generated by polymerizing at least one monomer selected from the group consisting of monomers represented by Formulae 1 to 3 below:

(Continued)

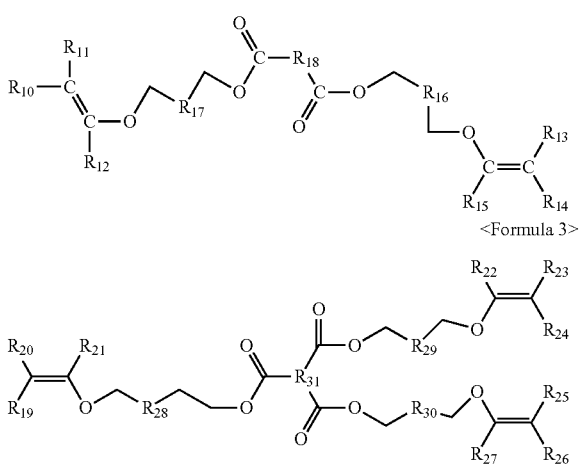

<Formula 2>

<Formula 3> wherein in Formulae 1 to 3, $R_1$ to $R_{31}$ are the same as defined in the detailed description of the specification.

25 Claims, 1 Drawing Sheet

(30) Foreign Application Priority Data

Oct. 27, 2009  (KR) .................. 10-2009-0102289
Jan. 14, 2011  (KR) .................. 10-2011-0004091

(51) Int. Cl.
*H01M 10/0567*  (2010.01)
*H01M 10/0568*  (2010.01)
*H01M 10/0569*  (2010.01)
*H01M 10/04*    (2006.01)
*H01M 10/0525*  (2010.01)

(52) U.S. Cl.
CPC ........ *H01M 10/0569* (2013.01); *H01M 10/04* (2013.01); *H01M 10/0525* (2013.01); *H01M 2300/0025* (2013.01); *H01M 2300/0085* (2013.01)

(56) References Cited

U.S. PATENT DOCUMENTS

| | | | |
|---|---|---|---|
| 5,756,231 A | 5/1998 | Andrei et al. | |
| 5,798,190 A | 8/1998 | Andrei et al. | |
| 6,482,545 B1 | 11/2002 | Skotheim et al. | |
| 6,511,769 B1 | 1/2003 | Jung et al. | |
| 2004/0076855 A1* | 4/2004 | Doushita et al. | 428/694 BA |
| 2004/0126665 A1 | 7/2004 | Sun | |
| 2008/0160404 A1* | 7/2008 | Lin et al. | 429/189 |
| 2009/0042346 A1* | 2/2009 | Kugler | 438/197 |
| 2010/0119956 A1 | 5/2010 | Tokuda et al. | |

FOREIGN PATENT DOCUMENTS

| | | | | |
|---|---|---|---|---|
| IT | EP 0638950 A1 * | 2/1995 | ......... | H01M 6/181 |
| JP | 1997223497 A | 8/1997 | | |
| JP | 1997223498 A | 8/1997 | | |
| JP | 2699280 B2 | 9/1997 | | |
| JP | 2000082328 A | 3/2000 | | |
| JP | 2002-050398 | 2/2002 | | |
| JP | 2004311140 A * | 11/2004 | ......... | H01M 10/40 |
| JP | 2007-134343 | 5/2007 | | |
| JP | 2008084838 A | 4/2008 | | |
| KR | 10-2000-0075395 | 12/2000 | | |
| KR | 10-2007-0008084 | 1/2007 | | |
| KR | 10-2010-0052407 | 5/2010 | | |
| WO | WO 2008/126800 | 10/2008 | | |

OTHER PUBLICATIONS

Japan Office Action for Patent Application No. 2009-257085 dated Nov. 26, 2013 with English Translation, 9 pages.
European Search Report issued Feb. 24, 2010 in corresponding European Patent Application No. 09175283.2.
European Search Report issued May 9, 2011, in corresponding European Application No. 09175283.2.
U.S. Appl. No. 12/615,376, filed Nov. 10, 2009, Seung-sik Hwang, et al., Samsung Electronics Co., Ltd.

* cited by examiner

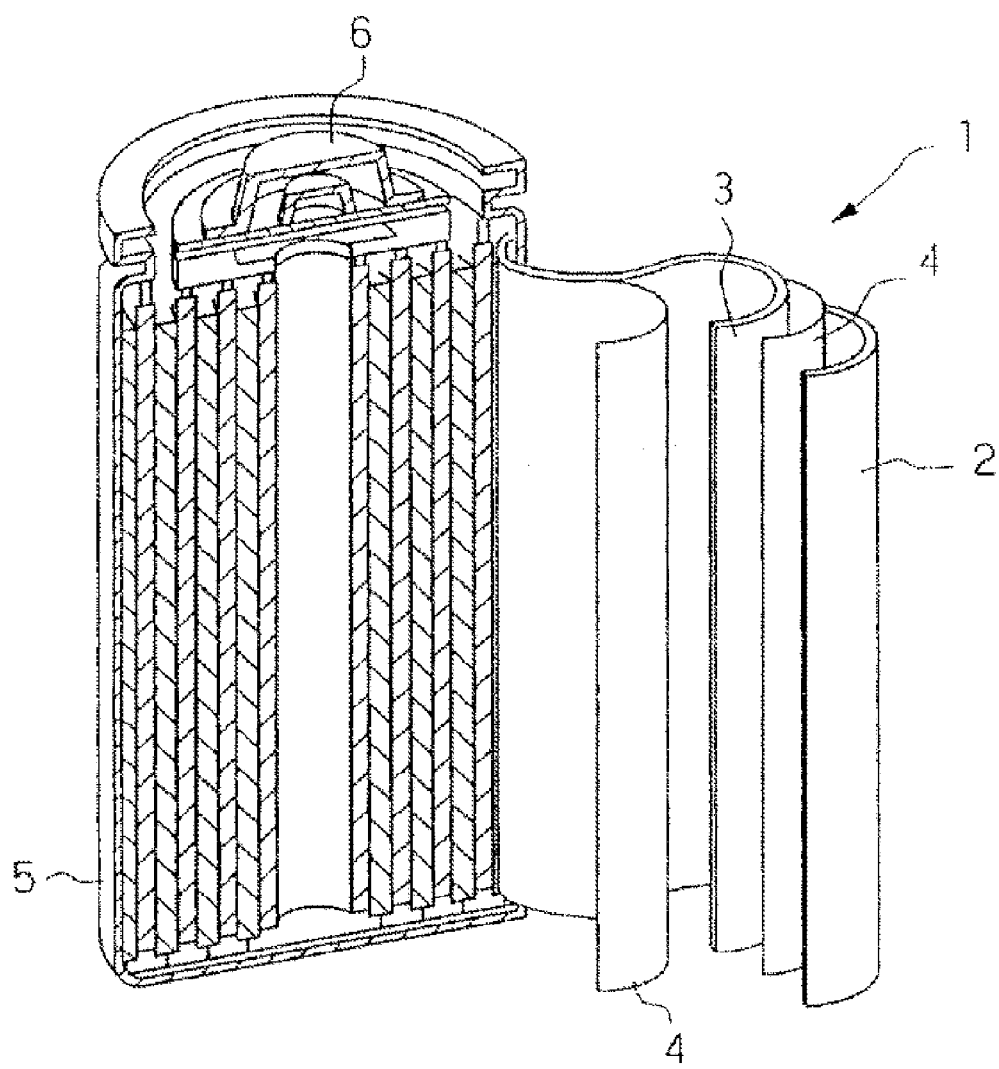

GEL POLYMER ELECTROLYTE, LITHIUM BATTERY INCLUDING GEL POLYMER ELECTROLYTE, AND METHOD OF PREPARING GEL POLYMER ELECTROLYTE

CROSS-REFERENCE TO RELATED APPLICATIONS

This application is a continuation-in-part application of U.S. application Ser. No. 12/615,376, filed Nov. 10, 2009, now U.S. Pat. No. 8,993,175 which claims the benefit of Korean Patent Application No. 10-2008-0111221, filed on Nov. 10, 2008, Korean Patent Application No. 10-2008-0121285, filed on Dec. 2, 2008, and Korean Patent Application No. 10-2009-0102289, filed on Oct. 27, 2009, all filed in the Korean Intellectual Property Office, the disclosures of which are incorporated herein in their entirety by reference. This application also claims the benefit of Korean Patent Application No. 10-2011-0004091, filed on Jan. 14, 2011 in the Korean Intellectual Property Office, the disclosure of which is incorporated herein in its entirety by reference.

BACKGROUND

1. Field

Aspects of the present disclosure relate to gel polymer electrolytes, lithium batteries including the gel polymer electrolytes, and methods of preparing the gel polymer electrolytes.

2. Description of the Related Art

Flexible electrical devices, such as electronic paper, are getting much attention as next generation products. Secondary batteries may be used as energy sources for flexible electrical devices. Secondary batteries for flexible electrical devices need to be flexible and should not allow leakage of an electrolytic solution to occur. Accordingly, an electrolyte suitable for secondary batteries may be a polymer electrolyte.

Flexible electrical devices may be manufactured by deposition-type thin filming or printing. Printing may be suitable for manufacturing of flexible electrical devices but the deposition method is complicated and expensive. Accordingly, secondary batteries need to be manufactured by printing, and correspondingly, polymer electrolytes included in secondary batteries need to be manufactured by printing.

A conventional polymer electrolyte is prepared by photo-curing or thermo-curing an electrolytic solution including a monomer and an initiator by exposing the electrolytic solution to an electronic beam or to heat. These methods require a separate curing device and are not suitable for printing. Accordingly, there is a need to develop a polymer electrolyte that is suitable for printing without a separate curing device.

SUMMARY

Aspects of the present invention provide gel polymer electrolytes.

Aspects of the present invention provide lithium batteries including the gel polymer electrolytes.

Aspects of the present invention provide methods of preparing the gel polymer electrolytes.

According to an aspect of the present invention, a gel polymer electrolyte includes: an organic solvent; a lithium salt that reacts with residual water contained in the organic solvent to produce at least one material selected from the group consisting of a protonic acid and a Lewis acid; and a polymer that is generated by polymerizing at least one monomer selected from the group consisting of monomers represented by Formulae 1 to 3 below:

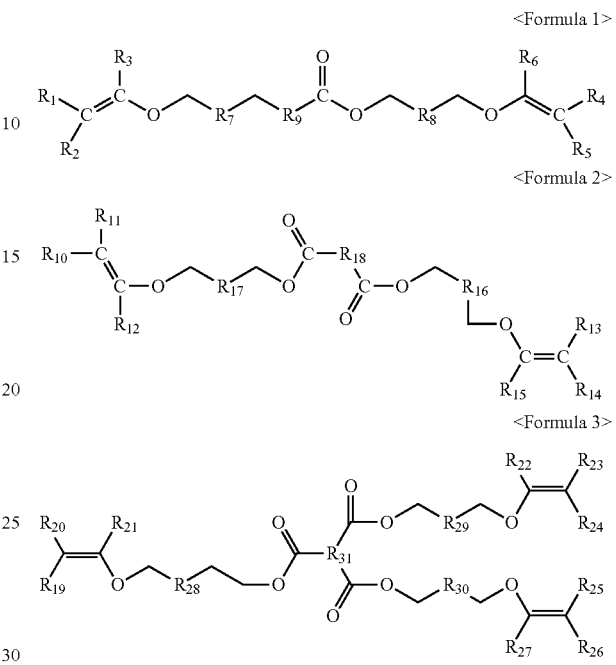

wherein in Formulae 1 to 3, $R_1$, $R_2$, $R_3$, $R_4$, $R_5$, $R_6$, $R_{10}$, $R_{11}$, $R_{12}$, $R_{13}$, $R_{14}$, $R_{15}$, $R_{19}$, $R_{20}$, $R_{21}$, $R_{22}$, $R_{23}$, $R_{24}$, $R_{25}$, $R_{26}$, and $R_{27}$ are each independently hydrogen, fluorine, or a fluorine-substituted or unsubstituted $C_{1-10}$ alkyl group, $R_7$, $R_8$, $R_{16}$, $R_{17}$, $R_{18}$, $R_{28}$, $R_{29}$, and $R_{30}$ are each independently a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, $R_9$ is -A-$R_z$— where A is an ester group, an ether group, a carbonyl group, a carbonate group, or an oxyethylene group, and $R_z$ is a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, and $R_{31}$ is a fluorine-substituted or unsubstituted $C_{5-20}$ cycloalkylene group, or a fluorine-substituted or unsubstituted $C_{6-20}$ arylene group.

According to another aspect of the present invention, a lithium battery includes a cathode; an anode; a separator, and the gel polymer electrolyte as described above.

According to another aspect of the present invention, a method of preparing a gel polymer electrolyte includes: separately preparing a first solution including an organic solvent and a lithium salt that reacts with residual water contained in the organic solvent to produce at least one material selected from the group consisting of a protonic acid and a Lewis acid; a second solution including at least one monomer selected from the group consisting of monomers represented by Formulae 1 to 3; and mixing the first solution with the second solution:

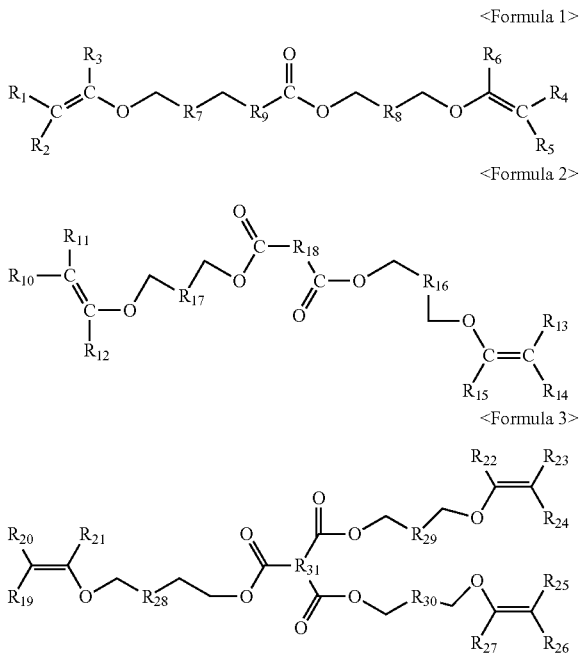

wherein in Formulae 1 to 3, $R_1$, $R_2$, $R_3$, $R_4$, $R_5$, $R_6$, $R_{10}$, $R_{11}$, $R_{12}$, $R_{13}$, $R_{14}$, $R_{15}$, $R_{19}$, $R_{20}$, $R_{21}$, $R_{22}$, $R_{23}$, $R_{24}$, $R_{25}$, $R_{26}$, and $R_{27}$ are each independently hydrogen, fluorine, or a fluorine-substituted or unsubstituted $C_{1-10}$ alkyl group, $R_7$, $R_8$, $R_{16}$, $R_{17}$, $R_{18}$, $R_{28}$, $R_{29}$, and $R_{30}$ are each independently a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, $R_9$ is $-A-R_z-$ where A is an ester group, an ether group, a carbonyl group, a carbonate group, or an oxyethylene group, and $R_z$ is a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, and $R_{31}$ is a fluorine-substituted or unsubstituted $C_{5-20}$ cycloalkylene group, or a fluorine-substituted or unsubstituted $C_{6-20}$ arylene group.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawing, of which:

FIG. 1 is a schematic view of a lithium battery according to an exemplary embodiment.

DETAILED DESCRIPTION

Reference will now be made in detail to the present embodiments of the present invention, examples of which are illustrated in the accompanying drawing, wherein like reference numerals refer to like elements throughout. The embodiments are described below in order to explain the present invention by referring to the FIGURE.

Hereinafter, polymer electrolytes, lithium batteries including the gel polymer electrolytes, and methods of preparing the gel polymer electrolytes, according to one or more embodiments of the present invention, will be described in detail.

A gel polymer electrolyte according to an embodiment of the present invention includes: an organic solvent; a lithium salt that reacts with residual water contained in the organic solvent to produce at least one material selected from the group consisting of a protonic acid and a Lewis acid; and a polymer that is generated by polymerizing at least one monomer selected from the group consisting of monomers represented by Formulae 1 to 3 below:

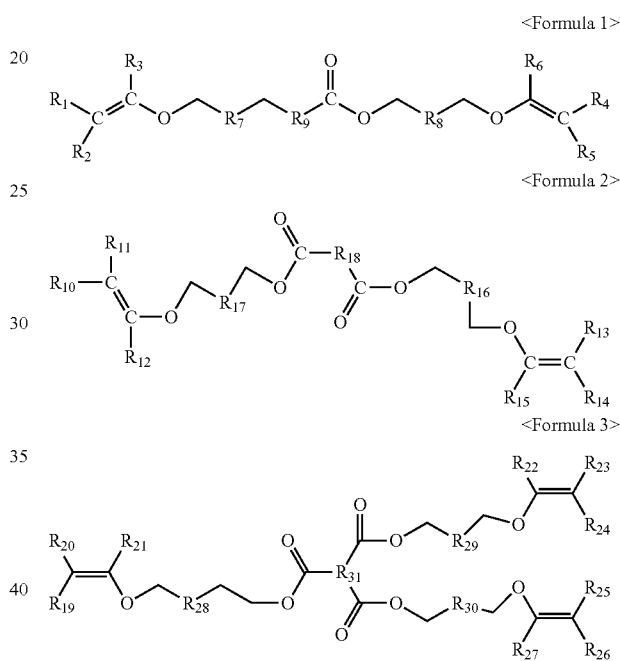

wherein in Formulae 1 to 3, $R_1$, $R_2$, $R_3$, $R_4$, $R_5$, $R_6$, $R_{10}$, $R_{11}$, $R_{12}$, $R_{13}$, $R_{14}$, $R_{15}$, $R_{19}$, $R_{20}$, $R_{21}$, $R_{22}$, $R_{23}$, $R_{24}$, $R_{25}$, $R_{26}$, and $R_{27}$ are each independently hydrogen, fluorine, or a fluorine-substituted or unsubstituted $C_{1-10}$ alkyl group, $R_7$, $R_8$, $R_{16}$, $R_{17}$, $R_{18}$, $R_{28}$, $R_{29}$, and $R_{30}$ are each independently a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, $R_9$ is $-A-R_z-$ where A is an ester group, an ether group, a carbonyl group, a carbonate group, or an oxyethylene group, and $R_z$ is a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, and $R_{31}$ is a fluorine-substituted or unsubstituted $C_{5-20}$ cycloalkylene group, or a fluorine-substituted or unsubstituted $C_{6-20}$ arylene group.

In Formulae 1 to 3, an ester group refers to $-C(=O)O-$, an ether group refers to $-O-$, a carbonyl group refers to $-C(=O)-$, a carbonate group refers to $-OC(=O)O-$, and an oxyethylene group refers to $-OCH_2CH_2-$.

An example of a process of generating a polymer by polymerizing monomers represented by Formulae 1 to 3 will now be described in detail. First, a lithium salt is reacted with residual water contained in the organic solvent to produce a protonic acid and/or a Lewis acid. For example, the polymer generating process may be represented by the following reaction schemes:

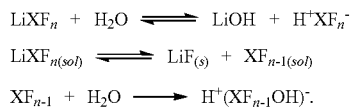

$LiXF_n + H_2O \rightleftharpoons LiOH + H^+XF_n^-$ $LiXF_{n(sol)} \rightleftharpoons LiF_{(s)} + XF_{n-1(sol)}$ $XF_{n-1} + H_2O \longrightarrow H^+(XF_{n-1}OH)^-$.

(X = B, P, As; n = 4, 6)

In the reaction schemes, $H^+XF_n^-$ is a protonic acid and $XF_{n-1(sol)}$ is a Lewis acid. The protonic acid and/or Lewis acid may function as a polymerization initiator by activating double bonds at termini of the monomers of Formulae 1 to 3 to initiate cationic polymerization. By the cationic polymerization, a crosslinked polymer may be generated. Due to inclusion of two or more functional groups in each of the monomers of Formulae 1 to 3, various cross-linking reactions may be performed to produce a matrix of a cross-linked polymer.

The polymer may be, before being completely cured in the polymerization process, impregnated with an electrolytic solution including an organic solvent, a lithium salt that reacts with residual water contained in the organic solvent to produce at least one material selected from the group consisting of a protonic acid and a Lewis acid, and a fluorine compound. That is, the polymer may be impregnated with an electrolytic solution including an organic solvent, a lithium salt that reacts with residual water contained in the organic solvent to produce at least one material selected from the group consisting of a protonic acid and a Lewis acid, and a fluorine compound, thereby producing a gel polymer electrolyte. The term 'gel polymer electrolyte' used herein refers to a polymer electrolyte that has a complete and uniform gel phase.

Since the monomers of Formulae 1 to 3 have an ester binding (—C(=O)O—) that is a polar function group, impregnation properties of the organic solvent, which also is polar, included in the electrolytic solution both during polymerization and within the polymer may be improved.

Also, since the monomers of Formulae 1 to 3 each have a long molecular chain, the cross-linking density in a cross-linked polymer is low and thus ions migrate easily. Thus, ionic conductivity of the gel polymer electrolyte may be improved. Also, due to the low cross-linking density, the amount of monomers necessary for forming the gel polymer electrolyte is relatively low. Accordingly, the gel polymer electrolyte may be formed by using a relatively small amount of monomers.

The gel polymer electrolyte may prevent an irreversible reaction between an electrode active material and the electrolytic solution, and during charge and discharge may function as a structure support for maintaining structures of the electrode active material and electrodes. Thus, a lithium battery including the gel polymer electrolyte may have enhanced charge and discharge characteristics, and enhanced electrical stability within the operating voltage range of the lithium battery.

In general, if a polymer is completely cured due to rapid polymerization before being impregnated with an organic solvent, the organic solvent may not permeate into the polymer. As a result, the cured polymer is separated from the organic solvent. For example, when the separated polymer is deposited on a surface of an electrode, the organic solvent may not contact the surface of the electrode, thereby making reactions of the electrode impossible.

However, when the monomers of Formulae 1 to 3 are used, the polymerization speed may be reduced due to increased distance between terminal functional groups, that is, vinyl groups in the monomers. Accordingly, the phenomenon that a cross-linked polymer is separated from the electrolytic solution by rapid polymerization and is deposited on the surface of the electrode may be prevented. Also, amounts of the lithium salt and the organic solvent permeating into the cross-linked polymer during the polymerization reaction may be increased.

Also, since the gel polymer electrolyte is formed by reacting monomers with a protonic acid and/or Lewis acid generated by reacting of a lithium salt and residual water, a separate curing device or an initiator are not used. Also, the monomer polymerization speed may be adjusted by controlling an amount and/or kind of the lithium salt and the monomers.

Also, the polymerization of the monomers of Formulae 1 to 3 may be performed at room temperature. The room temperature may be, for example, higher than the temperature at which the lithium salt is precipitated and lower than the boiling point of the organic solvent. For example, the room temperature may be about 10 to about 40° C.

In a gel polymer electrolyte according to another embodiment of the present invention, the lithium salt may be $LiBF_4$, $LiPF_6$, $LiAsF_6$, $LiSbF_6$, $LiPF_3(CF_2CF_3)_3$ or a mixture thereof, but is not limited thereto. For example, the lithium salt may be any one of various lithium salts that react with residual water contained in an electrolytic solution to generate a protonic acid or a Lewis acid.

In the gel polymer electrolyte, the concentration of the lithium salt may be about 0.1 to about 2.0 M. The concentration range is suitable for preparing a gel polymer electrolyte including a gel polymer.

The monomers of Formulae 1 to 3 included in the gel polymer electrolyte may each have a molecular weight of about 300 to about 2000, but are not limited thereto. For example, the molecular weights of the monomers may be in any of various ranges in which a gel polymer electrolyte is manufactured.

The amount of the polymer included in the gel polymer electrolyte may be about 0.1 to about 30 weight (wt.) % based on the total weight of the gel polymer electrolyte. That is, the concentration range may be suitable for manufacturing a gel polymer electrolyte including a gel polymer. For example, the amount of the polymer may be about 0.5 to about 20 wt. % based on the total weight of the gel polymer electrolyte. However, the amount of the polymer may be in any of various ranges in which the polymer provides charge and discharge characteristics to a lithium battery including the gel polymer electrolyte.

The total amount of the protonic acid or the Lewis acid which are generated from the lithium salt included in the gel polymer electrolyte may be about 0.2 to about 50 mM. If the amount of the protonic acid and/or Lewis acid is too low, it is less likely that polymerization occurs. On the other hand, if the amount of the protonic acid and/or Lewis acid is too high, the polymer is separated from the electrolytic solution due to rapid polymerization and is therefore precipitated.

The organic solvent included in the gel polymer electrolyte may be a solvent having a high dielectric constant, a solvent having a low boiling point, or a mixed solvent thereof. The dielectric constant of the solvent having a high dielectric constant may be about 30 to about 100, and the dielectric constant range may be suitable for the gel polymer electrolyte. The boiling point of the solvent having a low boiling point may be about 77 to about 150° C., and the boiling point range may be suitable for the gel polymer electrolyte. However, the organic solvent may not be limited thereto and may be any one of various organic solvents that are commonly used in the art.

The solvent having a high dielectric constant may be any one of various solvents that are commonly used in the art. Examples of the solvent having a high dielectric constant are a cyclic carbonate, such as a fluoroethylene carbonate, an ethylene carbonate, a propylene carbonate, or a butylene carbonate, gamma-butyrolactone, and a mixture thereof.

The solvent having a low boiling point may be any one of various solvents that are commonly used in the art. Examples of the solvent having a low boiling point are a chain-type carbonate, such as dimethyl carbonate, ethyl methyl carbonate, diethyl carbonate, or dipropyl carbonate; dimethoxyethane; diethoxyethane; a fatty acid ester derivative; or a mixture thereof.

In the mixed solvent including the solvent having a high dielectric constant and the solvent having a low boiling point, the ratio of the solvent having a high dielectric constant to the solvent having a low boiling point may be about 1:1 to about 1:9. The solvent ratio as described above may be suitable in terms of a discharge capacity and a charge and discharge lifespan. However, the solvent ratio may not be limited thereto.

A gel polymer electrolyte according to another embodiment of the present invention may further include a lithium salt that is inactive to the residual water contained in the organic solvent.

For example, a gel polymer electrolyte according to another embodiment of the present invention may include an organic solvent; a lithium salt that is inactive to residual water contained in the organic solvent; a lithium salt that reacts with residual water contained in the organic solvent to produce at least one material selected from the group consisting of a protonic acid and a Lewis acid; and a polymer that is generated by polymerizing at least one monomer selected from the group consisting of monomers represented by Formulae 1 to 3 below:

<Formula 1>

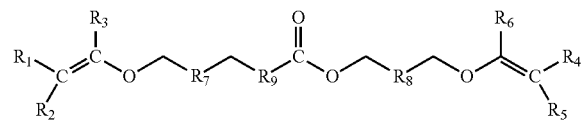

<Formula 2>

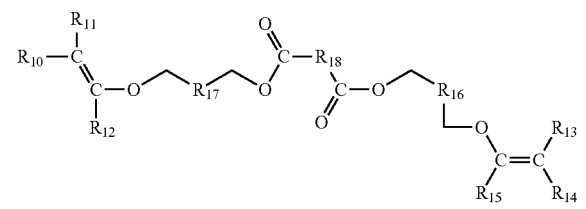

<Formula 3>

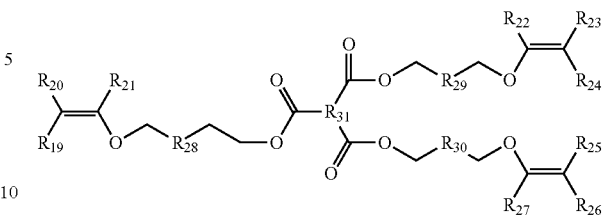

wherein in Formulae 1 to 3, $R_1$, $R_2$, $R_3$, $R_4$, $R_5$, $R_6$, $R_{10}$, $R_{11}$, $R_{12}$, $R_{13}$, $R_{14}$, $R_{15}$, $R_{19}$, $R_{20}$, $R_{21}$, $R_{22}$, $R_{23}$, $R_{24}$, $R_{25}$, $R_{26}$, and $R_{27}$ are each independently hydrogen, fluorine, or a fluorine-substituted or unsubstituted $C_{1-10}$ alkyl group, $R_7$, $R_8$, $R_{16}$, $R_{17}$, $R_{18}$, $R_{28}$, $R_{29}$, and $R_{30}$ are each independently a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, $R_9$ is -A-$R_z$— where A is an ester group, an ether group, a carbonyl group, a carbonate group, or an oxyethylene group, and $R_z$ is a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, and $R_{31}$ is a fluorine-substituted or unsubstituted $C_{5-20}$ cycloalkylene group, or a fluorine-substituted or unsubstituted $C_{6-20}$ arylene group.

The lithium salt that is inactive to residual water contained in the organic solvent may not be engaged in any polymerization reaction but may be related to resistance of the gel polymer electrolyte.

An example of a process of producing a polymer by polymerizing the monomers of Formulae 1 to 3 may include, as described above, generating a protonic acid and/or Lewis acid by reacting the lithium salt with the residual water contained in the organic solvent, and reacting the generated protonic acid and/or Lewis acid with at least one monomer of the monomers of Formulae 1 to 3.

The polymer may be, before being completely cured in the polymerization process, impregnated with an electrolytic solution including an organic solvent, a lithium salt that is inactive to residual water contained in the organic solvent, and a lithium salt that reacts with residual water contained in the organic solvent to produce at least one material selected from the group consisting of a protonic acid. That is, the polymer may be impregnated with an electrolytic solution including an organic solvent, a lithium salt that is inactive to residual water contained in the organic solvent, and a lithium salt that reacts with residual water contained in the organic solvent to produce at least one material selected from the group consisting of a protonic acid, thereby producing a gel polymer electrolyte.

Detailed descriptions of the polymerization reaction and the polymer may be the same as presented in connection with the gel polymer electrolyte that does not include the lithium salt that is inactive to residual water contained in the organic solvent.

Also, the polymerization of the monomers of Formulae 1 to 3 may be performed at room temperature. The room temperature may be, for example, higher than the temperature at which the lithium salt is precipitated and lower than the boiling point of the organic solvent. For example, the room temperature may be about 10 to about 40° C.

The lithium salt that is inactive to residual water contained in the organic solvent included in the gel polymer electrolyte may include at least one salt selected from the group consisting of LiCl, LiI, LiAlO$_2$, LiAlCl$_4$, LiClO$_4$, LiCF$_3$CO$_2$, LiN(COCF$_3$)$_2$, LiN(COCF$_2$CF$_3$)$_2$, LiCF$_3$SO$_3$, LiCF$_3$CF$_2$SO$_3$, LiC$_4$F$_9$SO$_3$, LiN(CF$_3$SO$_2$)$_2$, LiN(C$_2$F$_5$SO$_2$)$_2$, LiN(C$_p$F$_{2p+1}$SO$_2$)(C$_q$F$_{2q+1}$SO$_2$) (where p and q are integers), lithium difluoro (oxalato) borate (LiFOB), lithium bis(oxalato)borate (LiBOB), and lithium (malonato oxalato) borate (LiMOB), but is not limited thereto. The lithium salt that is inactive to residual water contained in the organic solvent may be any one of various lithium salts that are inactive to residual water contained in the organic solvent.

Also, the lithium salt that reacts with residual water contained in the organic solvent to produce at least one material selected from the group consisting of a protonic acid and a Lewis acid included in the gel polymer electrolyte additionally including the lithium salt that is inactive to residual water contained in the organic solvent may be LiBF$_4$, LiPF$_6$, LiAsF$_6$, LiSbF$_6$, LiPF$_3$(CF$_2$CF$_3$)$_3$, or a mixture thereof, but is not limited thereto. For example, the lithium salt that reacts with residual water contained in the organic solvent to produce at least one material selected from the group consisting of a protonic acid and a Lewis acid may be any one of various lithium salts that reacts with residual water contained in the organic solvent to produce at least one material selected from the group consisting of a protonic acid and a Lewis acid.

In the gel polymer electrolyte additionally including the lithium salt that is inactive to residual water contained in the organic solvent, the total amount of the lithium salt that is inactive to residual water contained in the organic solvent and the lithium salt that reacts with residual water contained in the organic solvent to produce at least one material selected from the group consisting of a protonic acid and a Lewis acid may be about 0.1 to about 2.0 M. The concentration range as described above may be suitable for preparation of a gel polymer electrolyte including a gel polymer.

In the gel polymer electrolyte additionally including the lithium salt that is inactive to residual water contained in the organic solvent, the monomers of Formulae 1 to 3 may each have a molecular weight of about 300 to about 2000, but are not limited thereto. For example, the molecular weights of the monomers may be in any of various ranges in which the gel polymer electrolyte is manufactured.

In the gel polymer electrolyte additionally including the lithium salt that is inactive to residual water contained in the organic solvent, the amount of the polymer may be about 0.1 to about 30 wt. % of the total weight of the gel polymer electrolyte. That is, the polymer concentration range is suitable for a gel polymer electrolyte including a gel polymer. For example, the amount of the polymer may be about 0.5 to about 20 wt. % of the total weight of the gel polymer electrolyte. However, the amount of the polymer may be in any range as long as a lithium battery including the gel polymer electrolyte provides excellent charge and discharge characteristics.

In the gel polymer electrolyte additionally including the lithium salt that is inactive to residual water contained in the organic solvent, the total weight of the a protonic acid and the Lewis acid which are generated from the lithium salt that reacts with residual water contained in the organic solvent to produce at least one material selected from the group consisting of a protonic acid and a Lewis acid may be about 0.2 to about 50 mM. When the amount of the protonic acid and/or Lewis acid is too low, it is less likely that polymerization is performed. On the other hand, when the amount of the protonic acid and/or Lewis acid is too high, the polymer is separated from the electrolytic solution due to rapid polymerization and precipitated.

A lithium battery according to another embodiment of the present invention includes a cathode, an anode, a separator, and the gel polymer electrolyte according to any one of the above embodiments. FIG. 1 is a schematic view of a lithium battery 1 according to this embodiment. Referring to FIG. 1, the lithium battery 1 includes a cathode 3, an anode 2 and a separator 4. The cathode 3, the anode 2 and the separator 4 are wound or folded and then accommodated in a battery case 5. The battery case 5 is injected with the first and the second electrolytic solutions and then sealed with a cap assembly 6, to complete the manufacture of the lithium battery 1. The battery case 5 may have a cylindrical, rectangular, or pouch-type shape. The lithium battery 1 may be a lithium ion battery.

An example of a method of manufacturing the lithium battery 1 will now be described in detail.

First, a cathode plate is prepared.

A cathode active material, a conductive agent, a binder, and a solvent are mixed to prepare a cathode active material composition. The cathode active material composition may be directly coated on an aluminum current collector and dried to form a cathode plate. Alternatively, the cathode active material composition may be cast on a separate support and separated from the support as a film and then the film is laminated on an aluminum current collector to form a cathode plate. Alternatively, the cathode active material composition may be prepared in the form of an electrode ink including excess solvent, and the electrode ink is printed on a support by ink-jetting or gravure printing to form a cathode plate. The printing method used herein may not be limited thereto, and may be any one of various methods that are used for coating or printing.

A cathode active material that is used in a cathode 3 may be any one of various lithium-containing metal oxides that are commonly used in the art. The cathode active material may include at least one composite oxide including lithium and metal selected from the group consisting of cobalt, manganese, nickel, and a combination thereof. Examples of the cathode active material are compounds represented by Li$_a$A$_{1-b}$B'$_b$D$_2$ where 0.90≤a≤1.8, and 0≤b≤0.5; Li$_a$E$_{1-b}$B'$_b$O$_{2-c}$D$_c$ where 0.90≤a≤1.8, 0≤b≤0.5, and 0≤c≤0.05; LiE$_{2-b}$B$_b$O$_{4-c}$D$_c$ where 0≤b≤0.5, and 0≤c≤0.05; Li$_a$Ni$_{1-b-c}$Co$_b$B'$_c$D$_\alpha$ where 0.90≤a≤1.8, 0≤b≤0.5, 0≤c≤0.05, and 0<α≤2; Li$_a$Ni$_{1-b-c}$Co$_b$B'$_c$O$_{2-\alpha}$F'$_\alpha$ where 0.90≤a≤1.8, 0≤b≤0.5, 0≤c≤0.05, and 0<α<2; Li$_a$Ni$_{1-b-c}$Co$_b$B$_c$O$_{2-\alpha}$F'$_2$ where 0.90≤a≤1.8, 0≤b≤0.5, 0≤c≤0.05, and 0<α<2; Li$_a$Ni$_{1-b-c}$Mn$_b$B'$_c$D$_\alpha$ where 0.90≤a≤1.8, 0≤b≤0.5, 0≤c≤0.05, and 0<α≤2; Li$_a$Ni$_{1-b-c}$Mn$_b$B'$_c$O$_{2-\alpha}$F'$_\alpha$ where 0.90≤a≤1.8, 0≤b≤0.5, 0≤c≤0.05, and 0<α<2; Li$_a$Ni$_{1-b-c}$Mn$_b$B'$_c$O$_{2-\alpha}$F'$_2$ where 0.90≤a≤1.8, 0≤b≤0.5, 0≤c≤0.05, and 0<α<2; Li$_a$Ni$_b$E$_c$G$_d$O$_2$ where 0.90≤a≤1.8, 0≤b≤0.9, 0≤c≤0.5, and 0.001≤d≤0.1; Li$_a$Ni$_b$Co$_c$Mn$_d$GeO$_2$ where 0.90≤a≤1.8, 0≤b≤0.9, 0≤c≤0.5, 0≤d≤0.5, and 0.001≤e≤0.1; Li$_a$NiG$_b$O$_2$ where 0.90≤a≤1.8, and 0.001≤b≤0.1; Li$_a$CoG$_b$O$_2$ where 0.90≤a≤1.8, and 0.001≤b≤0.1; Li$_a$MnG$_b$O$_2$ where 0.90≤a≤1.8, and 0.001≤b≤0.1; Li$_a$Mn$_2$G$_b$O$_4$ where 0.90≤a≤1.8, and 0.001≤b≤0.1; QO$_2$; QS$_2$; LiQS$_2$; V$_2$O$_5$; LiV$_2$O$_5$; LiI'O$_2$; LiNiVO$_4$; Li$_{(3-f)}$J$_2$(PO$_4$)$_3$(0≤f≤2); Li$_{(3-f)}$Fe$_2$(PO$_4$)$_3$(0≤f≤2); and LiFePO$_4$.

In the compound formulae above, A is Ni, Co, Mn, or a combination thereof; B' is Al, Ni, Co, Mn, Cr, Fe, Mg, Sr, V, rare-earth element or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

For example, the cathode active material may be $LiCoO_2$, $LiMn_xO_{2x}$(x=1, 2), $LiNi_{1-x}Mn_xO_{2x}$(0<x<1), $Ni_{1-x-y}Co_xMn_yO_2$ (0≤x≤0.5, 0≤y≤0.5), or $LiFePO_4$.

A coating layer may be further formed on a surface of the above compounds, or the compounds may be mixed with a compound including a coating layer for use. The coating layer may include a coating element compound, such as an oxide of a coating element, a hydroxide of a coating element, an oxyhydroxide of a coating element, an oxycarbonate of a coating element, or a hydroxycarbonate of a coating element. The coating layer compounds may be amorphous or crystalline. A coating element contained in the coating layer may be Mg, Al, Co, K, Na, Ca, Si, Ti, V, Sn, Ge, Ga, B, As, Zr, or a mixture thereof. The coating layer formation method may be any coating method as long as when used, an element does not adversely affect properties of the cathode active material. For example, the coating method may be spray coating, or precipitation. The coating methods are known to one of ordinary skill in the art and thus, will not be described in detail herein.

The conductive agent may be carbon black. The binder may be a vinylidene fluoride/hexafluoropropylene copolymer; polyvinylidenefluoride, polyacrylonitrile, polymethylmethacrylate, polytetrafluoroethylene, or a mixture thereof, or polyimide, polyamide imide, a styrene butadiene rubber-based polymer, an acrylate-based rubber, or a sodium carboxymethylcellulose. The solvent may be N-methylpyrrolidone (NMP), acetone, or water.

Amounts of the cathode active material, the conductive agent, the binder, and the solvent used herein may be used at the same levels as used in a traditional lithium battery.

Then, an anode plate is prepared.

As in the cathode plate preparation method, an anode active material, a conductive agent, a binder, and a solvent are mixed to prepare an anode active material composition, and the anode active material composition is directly coated on a copper current collector, thereby completing manufacture of an anode plate. Alternatively, the anode active material composition is cast on a separate support and separated from the support as an anode active material film and then the anode active material film is laminated on a copper current collector, thereby completing manufacture of the anode plate. Alternatively, the anode active material composition may be prepared in the form of an electrode ink including excess solvent, and the electrode ink is printed on a support by ink-jetting or gravure printing to form an anode plate. The printing method used herein may not be limited thereto, and may be any one of various methods that are used for coating or printing.

Examples of an anode active material that is used in the anode plate are graphite-based materials, such as graphite particles; a metal that is alloyable with lithium, such as silicon microparticles; graphite/silicon composite; and a transition metal oxide, such as lithium titanium oxide ($Li_4Ti_5O_{12}$); but are not limited thereto. For example, the anode active material may be any one of various materials that are used in the art. For example, graphite particles may be natural graphite or artificial graphite. The size of the graphite particles may be about 5 to about 30 μm, but is not limited thereto. The size of the silicon microparticles may be about 50 nm to about 10 μm, but is not limited thereto. Graphite particles and silicon microparticles may be integrated by a known method used in the art, such as mechanical milling, to form a graphite/silicon composite.

The conductive agent, the binder, and the solvent of the anode active material composition may be the same as in a cathode. Amounts of the anode active material, the conductive agent, the binder, and the solvent used herein may be used at the same levels as used in a traditional lithium battery.

A plasticizer may be added to the cathode active material composition and the anode active material composition to form pores in the corresponding electrode plate.

A separator 4 is prepared.

The cathode 3 and the anode 2 may be separated from each other by a separator 4, and the separator 4 may be any one of various separators that are used in a conventional lithium battery. The separator 4 may have a low resistance to flow of ions in an electrolyte and a high electrolytic solution-retaining capability. Examples of the separator 4 are glass fiber, polyester, polyethylene, polypropylene, polytetrafluoroethylene (PTFE), and a combination thereof, and these separators 4 may be in a non-woven or woven fabric form. For example, a separator 4 suitable for a lithium ion battery may be a rollable separator 4 formed of, for example, polyethylene or polypropylene, and a separator 4 suitable for a lithium ion polymer battery may be a separator 4 that has an excellent organic electrolytic solution-retaining capability.

An example of a method of forming the separator 4 will now be described in detail. A polymer resin, a filler, and a solvent are mixed to prepare a separator composition. The separator composition may be directly coated on an electrode and dried to form a separator 4. Alternatively, the separator composition may be cast on a support, dried, and then separated from the support as a separator film and then the separator film may be laminated on an electrode, thereby forming a separator 4.

The polymer resin used in forming the separator 4 may not be particularly limited and may be any one of various materials that are used as a binder of an electrode plate. Examples of the polymer are a vinylidenefluoride/hexafluoropropylene copolymer, polyvinylidenefluoride, polyacrylonitrile, polymethylmethacrylate, and a mixture thereof. For example, the polymer resin may be a vinylidenefluoride/hexafluoropropylene copolymer in which the amount of the hexafluoropropylene is about 8 to about 25 wt. %.

Then, an electrolyte is prepared.

The electrolyte may be any one of the gel polymer electrolytes according to the above embodiments. For example, the gel polymer electrolyte may include an organic solvent; a lithium salt that reacts with residual water contained in the organic solvent to produce at least one material selected from the group consisting of a protonic acid and a Lewis acid; and a polymer that is generated by polymerizing at least one monomer selected from the group, consisting of monomers represented by Formulae 1 to 3 below:

<Formula 1>

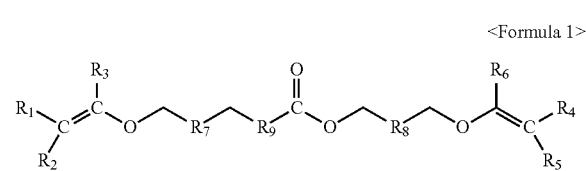

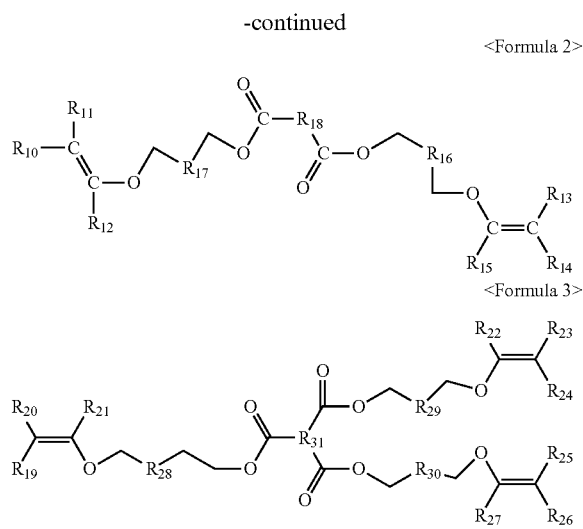

<Formula 2>

<Formula 3> wherein in Formulae 1 to 3, $R_1$, $R_2$, $R_3$, $R_4$, $R_5$, $R_6$, $R_{10}$, $R_{11}$, $R_{12}$, $R_{13}$, $R_{14}$, $R_{15}$, $R_{19}$, $R_{20}$, $R_{21}$, $R_{22}$, $R_{23}$, $R_{24}$, $R_{25}$, $R_{26}$, and $R_{27}$ are each independently hydrogen, fluorine, or a fluorine-substituted or unsubstituted $C_{1-10}$ alkyl group, $R_7$, $R_8$, $R_{16}$, $R_{17}$, $R_{18}$, $R_{28}$, $R_{29}$, and $R_{30}$ are each independently a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, $R_9$ is -A-$R_z$— where A is an ester group, an ether group, a carbonyl group, a carbonate group, or an oxyethylene group, and $R_z$ is a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, and $R_{31}$ is a fluorine-substituted or unsubstituted $C_{5-20}$ cycloalkylene group, or a fluorine-substituted or unsubstituted $C_{6-20}$ arylene group.

The separator 4 is interposed between the cathode plate and the anode plate to form a battery assembly unit. The battery assembly unit may be wound or folded and then placed in a cylindrical battery case or a rectangular battery case. Then, a first solution including an organic solvent and a lithium salt that reacts with residual water contained in the organic solvent to produce at least one material selected from the group consisting of a protonic acid and a Lewis acid and a second solution including at least one monomer selected from the group consisting of the monomers represented by Formulae 1 to 3 are sequentially or simultaneously injected into the battery case, thereby completing manufacture of a lithium ion polymer battery. When the first solution is mixed with the second solution, polymerization is performed to form a gel polymer electrolyte in which the polymer is impregnated with the organic solvent. Alternatively, in manufacturing a lithium battery 1, a gel polymer electrolyte may be formed on a cathode plate and/or anode plate by coating or printing. For example, a first solution including an organic solvent and a lithium salt that reacts with residual water contained in the organic solvent to produce at least one material selected from the group consisting of a protonic acid and a Lewis acid and a second solution including at least one monomer selected from the group consisting of the monomers represented by Formulae 1 to 3 are sequentially or simultaneously coated or printed on the anode plate and/or the cathode plate to form a gel polymer electrolyte, and a separator 4 is interposed between the cathode plate and/or the anode plate to prepare a battery assembly unit, and the battery assembly unit is wound or folded and then placed in a cylindrical battery case or a rectangular battery case, thereby completing manufacture of a lithium ion polymer battery.

The lithium ion polymer battery may be a flexible battery whose shape is changeable. For example, the lithium ion polymer battery may be easily bent.

A lithium battery 1 according to another embodiment of the present invention includes a cathode 3, an anode 2, a separator 4, and the gel polymer electrolyte further including a lithium salt that is inactive to residual water contained in the organic solvent.

A method of manufacturing the lithium battery including the gel polymer electrolyte additionally including the lithium salt that is inactive to residual water contained in the organic solvent are the same as described above, except that the lithium salt that is inactive to residual water contained in the organic solvent is additionally included.

That is, in the manufacturing process for the lithium battery 1, the lithium salt that is inactive to residual water contained in the organic solvent may be additionally included in the first solution and/or the second solution.

A method of preparing a gel polymer electrolyte, according to an embodiment of the present invention includes separately preparing a first solution including an organic solvent and a lithium salt that reacts with residual water contained in the organic solvent to produce at least one material selected from the group consisting of a protonic acid and a Lewis acid and a second solution including at least one monomer selected from the group consisting of the monomers represented by Formulae 1 to 3; and mixing the first solution with the second solution:

<Formula 1>

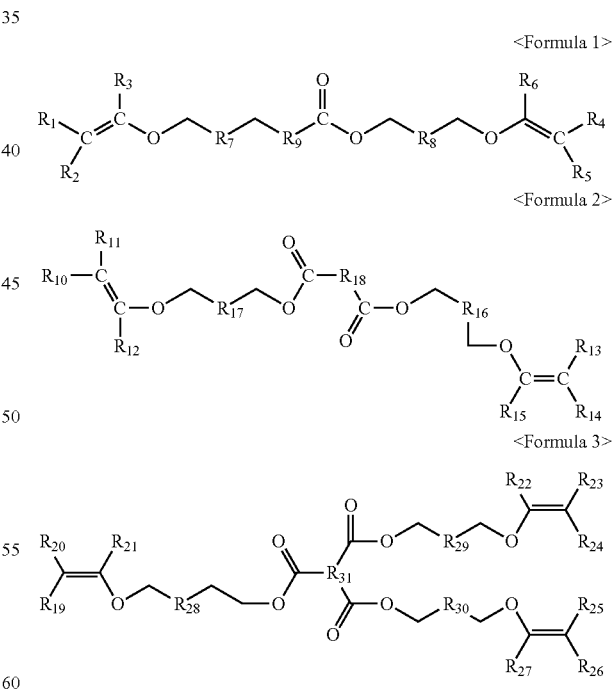

wherein in Formulae 1 to 3, $R_1$, $R_2$, $R_3$, $R_4$, $R_5$, $R_6$, $R_{10}$, $R_{11}$, $R_{12}$, $R_{13}$, $R_{14}$, $R_{15}$, $R_{19}$, $R_{20}$, $R_{21}$, $R_{22}$, $R_{23}$, $R_{24}$, $R_{25}$, $R_{26}$, and $R_{27}$ are each independently hydrogen, fluorine, or a fluorine-substituted or unsubstituted $C_{1-10}$ alkyl group, $R_7$, $R_8$, $R_{16}$, $R_{17}$, $R_{18}$, $R_{28}$, $R_{29}$, and $R_{30}$ are each independently a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, $R_9$ is -A-$R_z$— where A is an ester group, an ether group, a carbonyl group, a carbonate group, or an oxyethylene group, and $R_z$ is a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, and $R_{31}$ is a fluorine-substituted or unsubstituted $C_{5-20}$ cycloalkylene group, or a fluorine-substituted or unsubstituted $C_{6-20}$ arylene group.

In the method of preparing the gel polymer electrolyte, the lithium salt that reacts with residual water contained in the organic solvent to produce at least one material selected from the group consisting of a protonic acid and a Lewis acid, is reacted with the residual water contained in the organic solvent to produce a protonic acid and/or a Lewis acid. Due to the mixing of the first solution and the second solution, a cationic polymerization reaction of the monomers of Formulae 1 to 3 is initiated by the protonic acid and/or Lewis acid to produce a polymer.

A polymer generated by polymerizing the monomer of Formula 1 may be gelatinized due to impregnation with an electrolytic solution including the organic solvent, the lithium salt that is inactive to residual water contained in the organic solvent, and the lithium salt that reacts with residual water contained in the organic solvent to produce at least one material selected from the group consisting of a protonic acid and a Lewis acid.

In the method of preparing the gel polymer electrolyte, the second solution may additionally include an organic solvent.

The polymerization from Formula 1 may be performed at room temperature. The room temperature may be, for example, higher than the temperature at which the lithium salt is precipitated and lower than the boiling point of the organic solvent. For example, the room temperature may be about 10 to about 40° C.

Also, since the polymerization is initiated by the protonic acid or Lewis acid which is generated by the reaction with the residual water contained in the organic solvent, other polymerization initiators, such as heat or ultraviolet ray, need not be used. Accordingly, the preparation process for the gel polymer electrolyte is simple and easy.

Also, in the method of manufacturing the gel polymer electrolyte, the polymerization speed may be controlled according to amounts of the protonic acid and/or Lewis acid generated and the monomers.

The wider the distance between reactive functional groups at termini of each of the monomers of Formulae 1 to 3, the slower the polymerization speed. Thus, the polymerization speed may be easily adjusted.

In the method of manufacturing the gel polymer electrolyte, the mixing of the first solution and the second solution may be any one of various methods that are used in the art. For example, the mixing of the first solution and the second solution may be performed by simultaneously or sequentially coating or printing the first solution and the second solution on the cathode plate and/or the anode plate.

In the method of manufacturing the gel polymer electrolyte, the lithium salt that reacts with residual water contained in the organic solvent to produce at least one material selected from the group consisting of a protonic acid and a Lewis acid may be $LiBF_4$, $LiPF_6$, $LiAsF_6$, $LiSbF_6$, $LiPF_3(CF_2CF_3)_3$, or a mixture thereof, but is not limited thereto. Such a lithium battery may be any one of various lithium salts that reacts with residual water contained in the organic solvent to produce at least one material selected from the group consisting of a protonic acid and a Lewis acid.

Also, in the method of manufacturing the gel polymer electrolyte, at least one of the first solution and the second solution may further include the lithium salt that is inactive to residual water contained in the organic solvent. The lithium salt that is inactive to residual water contained in the organic solvent may include at least one salt selected from the group consisting of LiCl, LiI, $LiAlO_2$, $LiAlCl_4$, $LiClO_4$, $LiCF_3CO_2$, $LiN(COCF_3)_2$, $LiN(COCF_2CF_3)_2$, $LiCF_3SO_3$, $LiCF_3CF_2SO_3$, $LiC_4F_9SO_3$, $LiN(CF_3SO_2)_2$, $LiN(C_2F_5SO_2)_2$, $LiN(C_pF_{2p+1}SO_2)(C_qF_{2q+1}SO_2)$ (where p and q are integers), lithium difluoro (oxalato) borate (LiFOB), lithium bis(oxalato)borate (LiBOB), and lithium (malonato oxalato) borate (LiMOB), but is not limited thereto. For example, the lithium salt that is inactive to residual water contained in the organic solvent may be any one of various lithium salts that are inactive to residual water contained in the organic solvent.

Aspects of the present invention will be described in further detail with reference to the following examples. These examples are for illustrative purposes only and are not intended to limit the scope of the present invention.
(Preparation of Gel Polymer Electrolyte)

EXAMPLE 1

A first solution was prepared in which 1.0 M $LiBF_4$ was dissolved in 10 ml of a mixed solvent including ethylene carbonate (EC) and diethylcarbonate (DEC) at a volumetric ratio of 3:7. A second solution was prepared including 0.75 ml of bis[4-(vinyloxy)butyl]adipate represented by Formula 4 below.

The first solution and the second solution were mixed at room temperature of 20° C. and the mixed solution was left to sit. A polymerization reaction of the mixed solution was completed about 50 minutes after the mixing, thereby producing a gel polymer electrolyte.

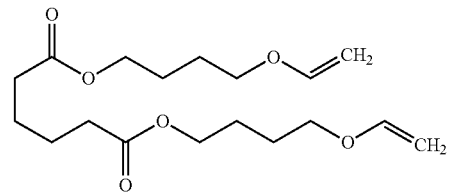

<Formula 4>

EXAMPLE 2

A mixed solution was prepared in the same manner as in Example 1, except that 1.0 ml of bis[4-(vinyloxy)butyl]adipate was used as a second solution.

A polymerization reaction of the mixed solution was completed about 20 minutes after the mixing, thereby producing a gel polymer electrolyte.

EXAMPLE 3

A mixed solution was prepared in the same manner as in Example 1, except that 0.75 ml of bis[4-(vinyloxymethyl)cyclohexylmethyl]glutarate) represented by Formula 5 below was used as a second solution.

A polymerization reaction of the mixed solution was completed about 50 minutes after the mixing, thereby producing a gel polymer electrolyte.

<Formula 5>

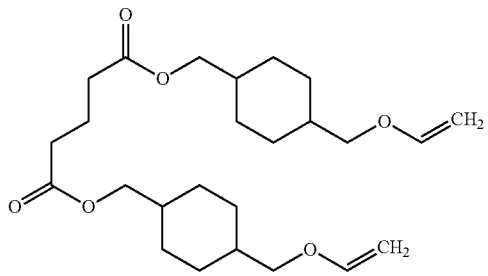

EXAMPLE 4

A mixed solution was prepared in the same manner as in Example 1, except that 1.0 ml of bis[4-(vinyloxymethyl) cyclohexylmethyl] glutarate was used as a second solution.

A polymerization reaction of the mixed solution was completed about 25 minutes after the mixing, thereby producing a gel polymer electrolyte.

EXAMPLE 5

A mixed solution was prepared in the same manner as in Example 1, except that 0.70 ml of tris[4-(vinyloxy)butyl] trimellitate) represented by Formula 6 below was used as a second solution.

A polymerization reaction of the mixed solution was completed about 30 minutes after the mixing, thereby producing a gel polymer electrolyte.

<Formula 6>

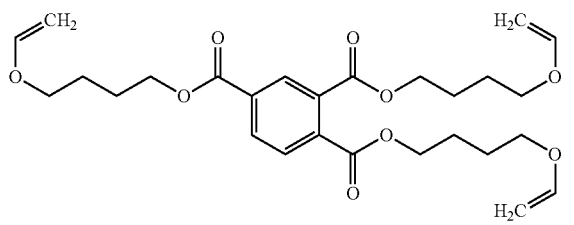

EXAMPLE 6

A mixed solution was prepared in the same manner as in Example 1, except that 1.0 ml of tris[4-(vinyloxy)butyl] trimellitate was used as a second solution.

A polymerization reaction of the mixed solution was completed about 20 minutes after the mixing, thereby producing a gel polymer electrolyte.

COMPARATIVE EXAMPLE 1

A mixed solution was prepared in the same manner as in Example 1, except that 1.0 ml of diethylene glycol divinyl ether represented by Formula 7 below was used as a second solution.

A polymerization reaction of the mixed solution was completed about 1 minute after the mixing, thereby producing a gel polymer electrolyte.

<Formula 7>

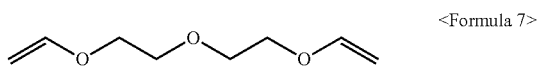

COMPARATIVE EXAMPLE 2

A mixed solution was prepared in the same manner as in Example 1, except that 0.75 ml of diethyleneglycol divinyl ether was used as a second solution.

Even after 24 hours, a gel phase and a liquid phase co-existed in the mixed solution.

COMPARATIVE EXAMPLE 3

A mixed solution was prepared in the same manner as in Example 1, except that 1.0 ml of triethyleneglycol divinyl ether represented by Formula 8 below was used as a second solution.

A polymerization reaction of the mixed solution was completed about 10 minutes after the mixing, thereby producing a gel polymer electrolyte.

<Formula 8>

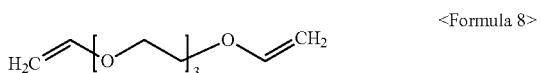

COMPARATIVE EXAMPLE 4

A mixed solution was prepared in the same manner as in Example 1, except that 0.75 ml of triethyleneglycol divinyl ether was used as a second solution.

Even after 24 hours, a gel phase and a liquid phase co-existed in the mixed solution.

(Manufacturing of Lithium Battery)

EXAMPLE 7

70 parts by weight of graphite particles having an average size of 25 μm (C1SR, Japan carbon), 15 parts by weight of a graphite-based conductive agent (SFG6, Timcal Inc.), and 30 parts by weight of a solution in which 5 wt. % polyvinylidenefluoride (PVdF) was dissolved in N-methylpyrrolidone were mixed in an agate mortar to prepare a slurry. The slurry was coated on a copper current collector having a thickness of 15 μm by using a doctor blade to form a layer having a thickness of about 60 μm, followed by drying in a hot wind drier at a temperature of 100° C. for 2 hours and drying under a vacuum condition at a temperature of 120° C. for 2 hours, thereby completing preparation of an anode plate.

$LiCoO_2$ powder having an average particle size of 20 μm and a carbon conductive agent (Ketjen Black; EC-600JD) were uniformly mixed at a weight ratio of 93:3, and then a polyvinylidene fluorine (PVDF) binder solution was added thereto to prepare a slurry in which a weigh ratio of active material: carbon conductive agent: binder was 93:3:4.

The slurry was coated on an aluminum foil having a thickness of 15 μm to form a layer having about 60 μm, followed by drying at a temperature of 100° C. in a hot wind drier for 2 hours and drying under a vacuum condition at a temperature of 120° C. for 2 hours, thereby completing preparation of a cathode plate.

A coin cell was manufactured at a temperature of 20° C. by using the cathode plate and the anode plate respectively as a cathode and an anode, a polypropylene separator (separator, Celgard® 3510) as a separator, and by sequential injection of the first solution and the second solution used in Example 1.

EXAMPLE 8

A coin cell was manufactured in the same manner as in Example 7 except that the first solution and the second solution used in Example 2 were sequentially injected.

EXAMPLE 9

A coin cell was manufactured in the same manner as in Example 7 except that the first solution and the second solution used in Example 3 were sequentially injected.

EXAMPLE 10

A coin cell was manufactured in the same manner as in Example 7 except that the first solution and the second solution used in Example 4 were sequentially injected.

EXAMPLE 11

A coin cell was manufactured in the same manner as in Example 7 except that the first solution and the second solution used in Example 5 were sequentially injected.

EXAMPLE 12

A coin cell was manufactured in the same manner as in Example 7 except that the first solution and the second solution used in Example 6 were sequentially injected.

COMPARATIVE EXAMPLE 5

A coin cell was manufactured in the same manner as in Example 7 except that the first solution and the second solution used in Comparative Example 1 were sequentially injected.

COMPARATIVE EXAMPLE 7

A coin cell was manufactured in the same manner as in Example 7 except that the first solution and the second solution used in Comparative Example 3 were sequentially injected.

EVALUATION EXAMPLE 1

Gel Formation

Phases of the polymer electrolytes prepared according to Examples 1 to 6 and Comparative Examples 1 to 4 were evaluated and the results are shown in Table 1 below.

TABLE 1

|  | State of Electrolyte [%] |
| --- | --- |
| Example 1 | gel |
| Example 2 | gel |
| Example 3 | gel |
| Example 4 | gel |
| Example 5 | gel |
| Example 6 | gel |
| Comparative Example 1 | gel |
| Comparative Example 2 | liquid state and gel |
| Comparative Example 3 | gel |
| Comparative Example 4 | liquid state and gel |

As shown in Table 1, in the case of Examples 1 to 6, a gel polymer electrolyte was formed when the monomer content was about 0.70 to about 0.75 ml or more, and in the case of Comparative Examples 1 to 4, a gel polymer electrolyte was formed when the monomer content was 1.0 ml or more.

In Table 1, "gel" means that a polymer electrolyte is complete gelatin, and "liquid state and gel" means that gel-state polymer is dispersed in a liquid electrolyte.

EVALUATION EXAMPLE 2

Ionic Conductivity Evaluation

Ionic conductivity of each of the gel polymer electrolytes prepared according to Examples 1 to 4 and Comparative Examples 1 and 3 was measured and the results are shown in Table 2 below. The ionic conductivity was measured by using a Solatron 1260 Impedance Analyzer.

TABLE 2

|  | Ionic conductivity [mS/cm] |
| --- | --- |
| Example 1 | 1.32 |
| Example 2 | 1.25 |
| Example 3 | 1.41 |
| Example 4 | 1.22 |
| Comparative Example 1 | 1.10 |
| Comparative Example 3 | 0.87 |

As shown in Table 2, the gel polymer electrolytes of Example 1 to 4 had higher ionic conductivity than the gel polymer electrolytes of Comparative Examples 1 and 3.

EVALUATION EXAMPLE 3

Charge and Discharge Test

The lithium batteries manufactured according to Examples 7 to 12 and Comparative Examples 5 and 7 were charged with a constant current of 100 mA per 1 g of an active material until the voltage reached 4.25 V (vs. Li) and subsequently, charged at a constant voltage of 4.25 V until the current reached 50 mA per 1 g of an active material. After 10 minutes of sitting, the lithium batteries were discharged with a constant current of 100 mA per 1 g of an active material until the voltage reached 3.0 V (vs. Li). The charge and discharge were repeatedly performed 50 times.

From the results, initial efficiency, a capacity retention rate, and an average efficiency were calculated using Equations 1 to 3 below. The results are shown in Table 3 below.

Initial efficiency=first cycle discharge capacity/first cycle charge capacity  <Equation 1>

Capacity retention rate in 50$^{th}$ cycle=50$^{th}$ cycle discharge capacity/first cycle discharge capacity  <Equation 2>

Average efficiency=an average of (discharge capacity/charge capacity) in the respective cycles  <Equation 3>

TABLE 3

|  | Initial efficiency [%] | Capacity retention rate in 50$^{th}$ cycle [%] | Average efficiency [%] |
| --- | --- | --- | --- |
| Example 7 | 90.8 | 93.5 | 99.2 |
| Example 8 | 91.4 | 92.7 | 99.2 |
| Example 9 | 90.7 | 90.7 | 99.2 |
| Example 10 | 90.5 | 90.5 | 99.1 |
| Example 11 | 91.6 | 90.6 | 99.1 |
| Example 12 | 92.6 | 89.9 | 99.0 |
| Comparative Example 5 | 90.4 | 90.4 | 99.0 |
| Comparative Example 7 | 89.8 | 89.8 | 98.9 |

As shown in Table 1, the lithium batteries of Examples 7 to 12 and the lithium batteries of Comparative Examples 5 and 7 had similar initial efficiency, capacity retention rate, and average efficiency.

As described above, according to the one or more of the above embodiments of the present invention, a gel polymer electrolyte is easily prepared at room temperature without using a separate curing device even at a low monomer concentration due to mixing of a lithium salt that reacts with residual water contained in an organic solvent to produce at least one material selected from the group consisting of a protonic acid and a Lewis acid and a monomer including an ester group. The gel polymer electrolyte may have enhanced ionic conductivity and a lithium battery including the gel polymer electrolyte has excellent charge and discharge characteristics.

It should be understood that the exemplary embodiments described herein should be considered in a descriptive sense only and not for purposes of limitation. Descriptions of features or aspects within each embodiment should typically be considered as available for other similar features or aspects in other embodiments. Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A gel polymer electrolyte comprising:
    an organic solvent containing residual water;
    a lithium salt that is reactive with the residual water contained in the organic solvent to produce at least one material selected from the group consisting of a protonic acid and a Lewis acid;
    no separate initiator; and
    a polymer that is a polymerization product of at least one monomer selected from the group consisting of monomers represented by Formulae 1 to 3 below:

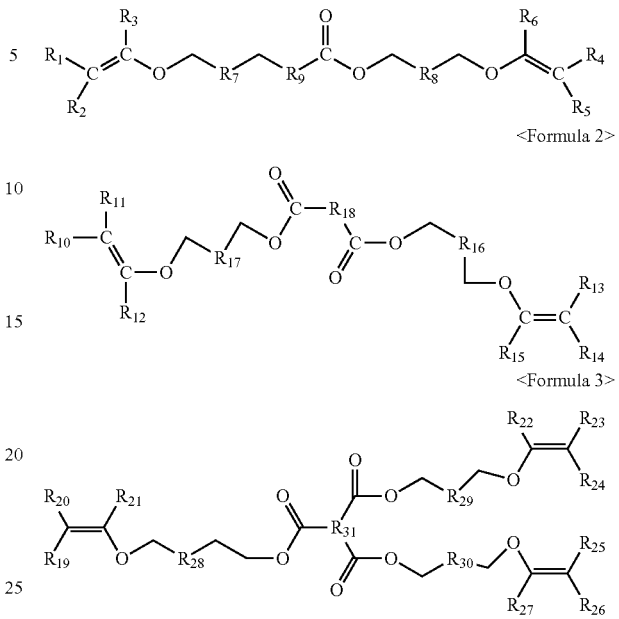

wherein in Formulae 1 to 3,
    $R_1$, $R_2$, $R_3$, $R_4$, $R_5$, $R_6$, $R_{10}$, $R_{11}$, $R_{12}$, $R_{13}$, $R_{14}$, $R_{15}$, $R_{19}$, $R_{20}$, $R_{21}$, $R_{22}$, $R_{23}$, $R_{24}$, $R_{25}$, $R_{26}$, and $R_{27}$ are each independently hydrogen, fluorine, or a fluorine-substituted or unsubstituted $C_{1-10}$ alkyl group,
    $R_7$, $R_8$, $R_{16}$, $R_{17}$, $R_{18}$, $R_{28}$, $R_{29}$, and $R_{30}$ are each independently a fluorine-substituted or unsubstituted $C_{1-10}$ alkylene group or a fluorine-substituted or unsubstituted $C_{6-20}$ arylene group,
    $R_9$ is -A-$R_z$— where A is an ester group, an ether group, a carbonyl group, a carbonate group, or an oxyethylene group, and $R_z$ is a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, and
    $R_{31}$ is a fluorine-substituted or unsubstituted $C_{5-20}$ cycloalkylene group, or a fluorine-substituted or unsubstituted $C_{6-20}$ arylene group;
    which monomers react in the presence of said protonic acid or Lewis acid, using no separate initiator or curing device.

2. The gel polymer electrolyte of claim 1, wherein the polymer is a product of reacting at least one material selected from the group consisting of the protonic acid and the Lewis acid generated by reacting the lithium salt with the residual water contained in the organic solvent, with at least one monomer selected from the group consisting of the monomers of Formulae 1 to 3.

3. The gel polymer electrolyte of claim 1, wherein the polymer is a gelatinized product of impregnation with an electrolytic solution comprising the organic solvent and the lithium salt.

4. The gel polymer electrolyte of claim 1, wherein the lithium salt is at least one salt selected from the group consisting of $LiBF_4$, $LiPF_6$, $LiAsF_6$, $LiSbF_6$, and $LiPF_3(CF_2CF_3)_3$.

5. The gel polymer electrolyte of claim 1, wherein the amount of the lithium salt is about 0.1 to about 2 M.

6. The gel polymer electrolyte of claim 1, wherein the molecular weight of each of the monomers represented by Formulae 1 to 3 is about 300 to about 2000.

7. The gel polymer electrolyte of claim 1, wherein the amount of the polymer is about 0.1 to about 30 wt. % based on the total weight of the gel polymer electrolyte.

8. The gel polymer electrolyte of claim 1, wherein the total amount of the protonic acid and the Lewis acid generated from the lithium salt is about 0.2 to about 50mM.

9. A lithium battery comprising: a cathode; an anode; a separator, and the gel polymer electrolyte of claim 1.

10. A gel polymer electrolyte comprising:
an organic solvent containing residual water;
a lithium salt that is inactive to residual water contained in the organic solvent;
a lithium salt that is reactive with the residual water contained in the organic solvent to produce at least one material selected from the group consisting of a protonic acid and a Lewis acid;
no separate initiator; and
a polymer that a polymerization product of at least one monomer selected from the group consisting of monomers represented by Formulae 1 to 3 below:

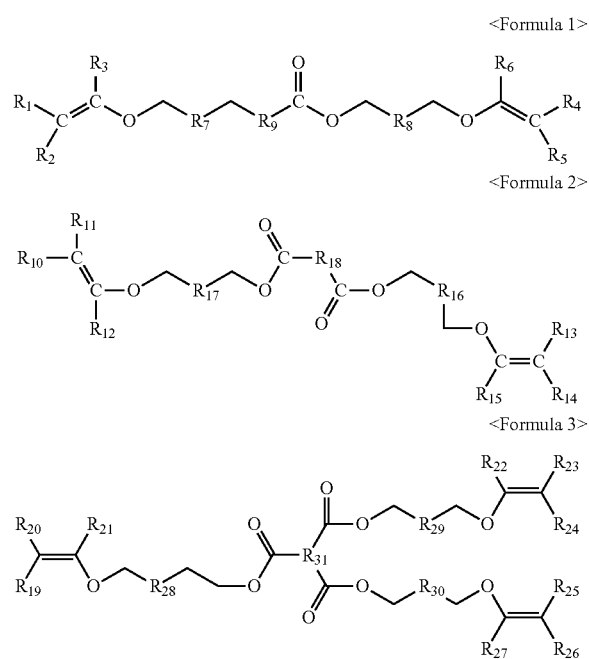

wherein in Formulae 1 to 3,
$R_1$, $R_2$, $R_3$, $R_4$, $R_5$, $R_6$, $R_{10}$, $R_{11}$, $R_{12}$, $R_{13}$, $R_{14}$, $R_{15}$, $R_{19}$, $R_{20}$, $R_{21}$, $R_{22}$, $R_{23}$, $R_{24}$, $R_{25}$, $R_{26}$, and $R_{27}$ are each independently hydrogen, fluorine, or a fluorine-substituted or unsubstituted $C_{1-10}$ alkyl group,
$R_7$, $R_8$, $R_{16}$, $R_{17}$, $R_{18}$, $R_{28}$, $R_{29}$, and $R_{30}$ are each independently a fluorine-substituted or unsubstituted $C_{1-10}$ alkylene group or a fluorine-substituted or unsubstituted $C_{6-20}$ arylene group,
$R_9$ is -A-$R_z$— where A is an ester group, an ether group, a carbonyl group, a carbonate group, or an oxyethylene group, and $R_z$ is a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, and $R_{31}$ is a fluorine-substituted or unsubstituted $C_{5-20}$ cycloalkylene group, or a fluorine-substituted or unsubstituted $C_{6-20}$ arylene group;
which monomers are reactive in the presence of said protonic acid or Lewis acid, using no separate initiator or curing device.

11. The gel polymer electrolyte of claim 10, wherein the polymer is a product of reacting at least one material selected from the group consisting of the protonic acid and the Lewis acid generated by reacting the lithium salt with the residual water contained in the organic solvent, with at least one monomer selected from the group consisting of the monomers of Formulae 1 to 3.

12. The gel polymer electrolyte of claim 10, wherein the polymer is a gelatinized product of impregnation with an electrolytic solution comprising the organic solvent, the lithium salt that is inactive to residual water contained in the organic solvent, and the lithium salt that reacts with residual water contained in the organic solvent to produce at least one material selected from the group consisting of a protonic acid and a Lewis acid.

13. The gel polymer electrolyte of claim 10, wherein the lithium salt that is inactive to residual water contained in the organic solvent is at least one salt selected from the group consisting of LiCl, LiI, $LiAlO_2$, $LiAlCl_4$, $LiClO_4$, $LiCF_3CO_2$, $LiN(COCF_3)_2$, $LiN(COCF_2CF_3)_2$, $LiCF_3SO_3$, $LiCF_3CF_2SO_3$, $LiC_4F_9SO_3$, $LiN(CF_3SO_2)_2$, $LiN(C_2F_5SO_2)_2$, $LiN(C_pF_{2p+1}SO_2)(C_qF_{2q+1}SO_2)$ (where p and q are integers), lithium difluoro (oxalato) borate (LiFOB), lithium bis(oxalato)borate (LiBOB), and lithium (malonato oxalato) borate (LiMOB).

14. The gel polymer electrolyte of claim 10, wherein the lithium salt that reacts with residual water contained in the organic solvent to produce at least one material selected from the group consisting of a protonic acid and a Lewis acid is at least one salt selected from the group consisting of $LiBF_4$, $LiPF_6$, $LiAsF_6$, $LiSbF_6$, and $LiPF_3(CF_2CF_3)_3$.

15. The gel polymer electrolyte of claim 10, wherein the total amount of the lithium salt that is inactive to residual water contained in the organic solvent and the lithium salt that reacts with residual water contained in the organic solvent to produce at least one material selected from the group consisting of a protonic acid and a Lewis acid is about 0.1 to about 2M.

16. The gel polymer electrolyte of claim 10, wherein the molecular weight of each of the monomers represented by Formulae 1 to 3 is about 300 to about 2000.

17. The gel polymer electrolyte of claim 10, wherein the amount of the polymer is about 0.1 to about 30 wt. % based on the total weight of the gel polymer electrolyte.

18. The gel polymer electrolyte of claim 10, wherein the total amount of the protonic acid and the Lewis acid generated from the lithium salt is about 0.2 to about 50 mM.

19. A lithium battery comprising a cathode, an anode, a separator, and the gel polymer electrolyte of claim 10.

20. A method of preparing a gel polymer electrolyte, the method comprising:
separately preparing a first solution including an organic solvent and a lithium salt that reacts with residual water contained in the organic solvent to produce at least one material selected from the group consisting of a protonic acid and a Lewis acid and a second solution including at least one monomer selected from the group consisting of monomers represented by Formulae 1 to 3; and mixing the first solution with the second solution:

<Formula 1>

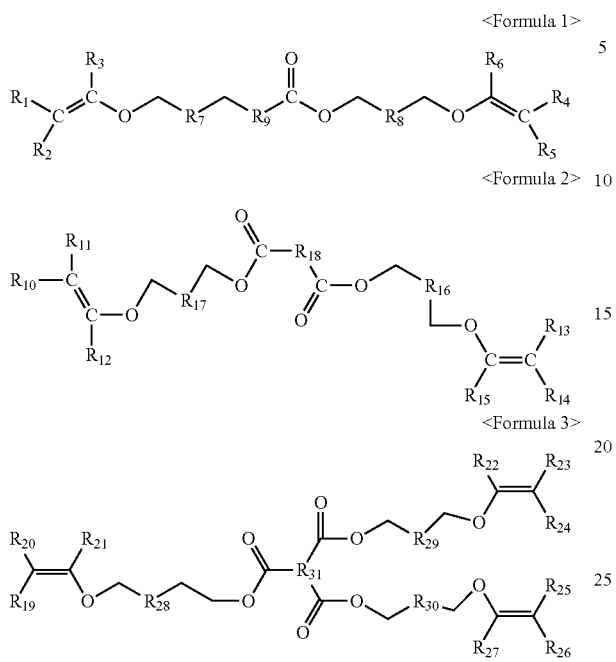

<Formula 2>

<Formula 3> wherein in Formulae 1 to 3,
$R_1$, $R_2$, $R_3$, $R_4$, $R_5$, $R_6$, $R_{10}$, $R_{11}$, $R_{12}$, $R_{13}$, $R_{14}$, $R_{15}$, $R_{19}$, $R_{20}$, $R_{21}$, $R_{22}$, $R_{23}$, $R_{24}$, $R_{25}$, $R_{26}$, and $R_{27}$ are each independently hydrogen, fluorine, or a fluorine-substituted or unsubstituted $C_{1-10}$ alkyl group, $R_7$, $R_8$, $R_{16}$, $R_{17}$, $R_{18}$, $R_{28}$, $R_{29}$, and $R_{30}$ are each independently a fluorine-substituted or unsubstituted $C_{1-10}$ alkylene group or a fluorine-substituted or unsubstituted $C_{6-20}$ arylene group, $R_9$ is -A-$R_z$— where A is an ester group, an ether group, a carbonyl group, a carbonate group, or an oxyethylene group, and $R_z$ is a fluorine-substituted or unsubstituted $C_{1-10}$ alkylene group, a fluorine-substituted or unsubstituted $C_{5-20}$ cycloalkylene group, or a fluorine-substituted or unsubstituted $C_{6-20}$ arylene group, and $R_{31}$ is a fluorine-substituted or unsubstituted $C_{5-20}$ cycloalkylene group, or a fluorine-substituted or unsubstituted $C_{6-20}$ arylene group;

using no separate initiator or curing device.

21. The method of claim 20, wherein the mixing of the first solution and the second solution further comprises simultaneously or sequentially coating or printing the first solution and the second solution on an electrode.

22. The method of claim 20, wherein the lithium salt that reacts with residual water contained in the organic solvent to produce at least one material selected from the group consisting of a protonic acid and a Lewis acid is at least one salt selected from the group consisting of $LiBF_4$, $LiPF_6$, $LiAsF_6$, $LiSbF_6$, and $LiPF_3(CF_2CF_3)_3$.

23. The method of claim 20, wherein at least one solution selected from the group consisting of the first solution and second solution further comprises a lithium salt that is inactive to residual water contained in the organic solvent.

24. The method of claim 23, wherein the lithium salt that is inactive to residual water contained in the organic solvent is at least one salt selected from the group consisting of LiCl, LiI, $LiAlO_2$, $LiAlCl_4$, $LiClO_4$, $LiCF_3CO_2$, $LiN(COCF_3)_2$, $LiN(COCF_2CF_3)_2$, $LiCF_3SO_3$, $LiCF_3CF_2SO_3$, $LiC_4F_9SO_3$, $LiN(CF_3SO_2)_2$, $LiN(C_2F_5SO_2)_2$, $LiN(C_pF_{2p+1}SO_2)(C_qF_{2q+1}SO_2)$ (where p and q are integers), lithium difluoro (oxalato) borate (LiFOB), lithium bis(oxalato)borate (LiBOB), and lithium (malonato oxalato) borate (LiMOB).

25. A gel polymer electrolyte comprising:
an organic solvent containing residual water;
lithium tetrafluoroborate;
no separate initiator; and
a polymer that is a polymerization product of at least one monomer selected from the group consisting of monomers represented by Formulae 2 to 3 below:

<Formula 2>

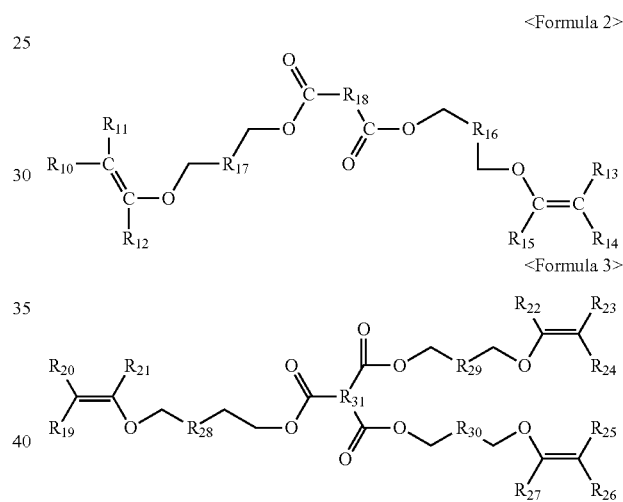

<Formula 3> wherein in Formulae 2 to 3,
$R_{10}$, $R_{11}$, $R_{12}$, $R_{13}$, $R_{14}$, $R_{15}$, $R_{19}$, $R_{20}$, $R_{21}$, $R_{22}$, $R_{23}$, $R_{24}$, $R_{25}$, $R_{26}$, and $R_{27}$ are each hydrogen,
$R_{16}$, $R_{17}$, $R_{18}$, $R_{28}$, $R_{29}$, and $R_{30}$ are each independently a fluorine-substituted or unsubstituted $C_{1-10}$ alkylene group or a fluorine-substituted or unsubstituted $C_{6-20}$ arylene group,
$R_{31}$ is a fluorine-substituted or unsubstituted $C_{5-20}$ cycloalkylene group, or a fluorine-substituted or unsubstituted $C_{6-20}$ arylene group;
which monomers are reactive using no separate initiator or curing device.

* * * * *